United States Patent [19]
Quick

[11] 3,942,307
[45] Mar. 9, 1976

[54] BILLET ELEVATOR FOR SUGAR CANE HARVESTERS

[75] Inventor: Donald Jonathon Quick, Bundaberg, Australia

[73] Assignee: Massey-Ferguson Services N.V., Curacao, Netherlands

[22] Filed: Oct. 16, 1974

[21] Appl. No.: 515,288

[30] Foreign Application Priority Data
Nov. 3, 1973  United Kingdom............... 51138/73

[52] U.S. Cl. .................. 56/13.9; 56/14.5; 56/16.6; 198/165
[51] Int. Cl.²......................................... A01D 45/10
[58] Field of Search ......... 56/13.9, 14.3, 14.5, 16.4, 56/16.5, 16.6, 27.5; 198/165, 163

[56] References Cited
UNITED STATES PATENTS

| | | |
|---|---|---|
| 1,698,670 | 1/1929 | Buguet................................. 56/13.9 |
| 2,535,884 | 12/1950 | Woods.............................. 56/13.9 X |
| 2,761,633 | 9/1956 | Sindzinski....................... 198/165 X |
| 2,805,762 | 9/1957 | Kampfer............................... 198/165 |
| 3,103,091 | 9/1963 | Duncan et al. ...................... 56/13.9 |
| 3,830,046 | 8/1974 | Rollitt.................................. 56/16.5 |

*Primary Examiner*—Hugh R. Chamblee
*Assistant Examiner*—J. N. Eskovitz
*Attorney, Agent, or Firm*—Robert L. Farris

[57] ABSTRACT

Chain and slat type elevator for pieces of chopped sugar cane in a sugar cane harvester has a slope of between 50° and 90° with respect to the horizontal. An endless belt of wire mesh above the working run of the elevator engages the cane pieces and prevents them rolling back.

8 Claims, 3 Drawing Figures

BILLET ELEVATOR FOR SUGAR CANE HARVESTERS

This invention realates to sugar cane harvesters having cane base cutting means operative to sever cane sticks from their roots and cane dividing means operative to cut each cane stick into two or more pieces.

In sugar cane harvesters of this kind an elevator may be provided for the cane pieces. The elevator may serve to elevate the cane pieces before they are dropped through a trash removal zone. Alternatively, or in addition, the elevator may serve to elevate the cane pieces to a discharge point from which they can fall into a container for transportation to a cane processing station.

In either case, the problem arises that the combination of cane base cutting means, cane dividing means and the elevator requires the overall length of the harvester to be such that its stability and manoeuvrability characteristics are somewhat handicapped.

An object of the present invention is to provide means whereby a sugar cane harvester of the kind referred-to above can be constructed so as to have a shorter overall length than hitherto.

According to the invention there is provided a sugar cane harvester comprising cane base cutting means capable of severing cane sticks from their roots, cane dividing means capable of cutting each cane stick into two or more pieces, and an elevator capable of elevating the cane pieces, characterized in that at least part of the travel of the elevator extends upwards at an inclination of from 50° to 90° with respect to the horizontal when the harvester is standing on horizontal ground, and that cane retaining means is provided, said cane retaining means extending in the direction of travel of the elevator and being positioned above the cane-engaging surface thereof so as to be capable of engaging cane carried thereon and of thereby resisting rolling back of cane pieces carried by the elevator.

Preferably the cane retaining means comprises a drivable cane-engageable member mounted so as to be capable of moving in the direction of travel of cane carried by the elevator.

An embodiment of the invention will now be described by way of example with reference to the accompanying drawings in which.

Figure 1:
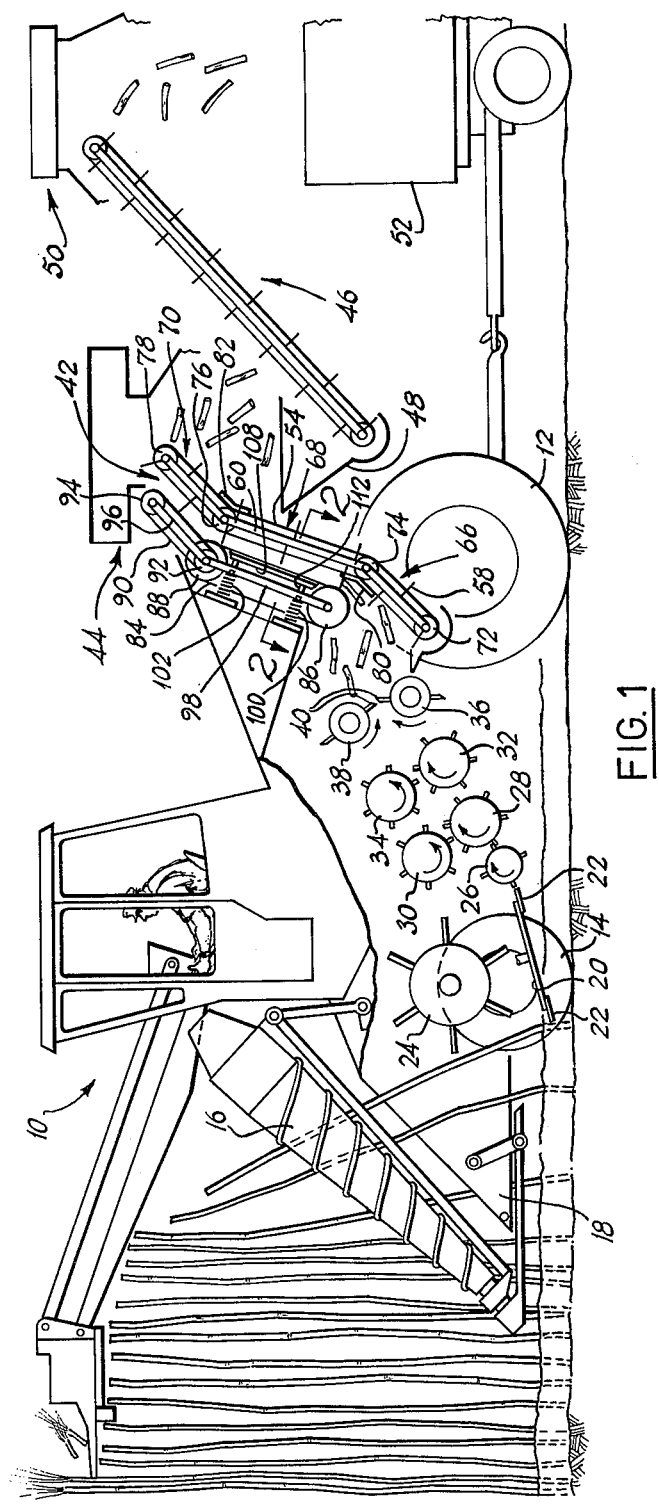
FIG. 1 shows, somewhat diagrammatically, the sugar cane harvester in side elevation and partially cut-away to reveal its internal crop-handling apparatus.

A sugar cane harvester 10 comprises rear traction wheels 12 and front steerable wheels 14. A pair of drivable crop lifters 16 are mounted above respective spaced gathering walls 18.

Cane base-cutting means comprises a pair of drivable contra-rotatable discs 20 carrying blades 22.

Stick feeding apparatus for conveying rearwards cane sticks severed by the base-cutting means comprises a large paddle roller 24 mounted above base cutter discs 20, a paddle-type butt-lifter roller 26, and two pairs of paddle-type cleaning and feeding rollers 28, 30 and 32, 34.

Cane dividing means comprises a pair of contra-rotatable chopper drums 36, 38 each carrying a pair of axially-extending blades 40.

A chain and slat type elevator 42, described more fully below, is provided to carry cane pieces or billets from chopper drums 36, 38 to trash removal apparatus 44. A second chain and slat elevator 46 leads from a hopper 48 to second trash removal apparatus 50. A trailer 52 is pulled by the harvester to receive the harvested cane.

The structure of elevator 42 will now be described in detail.

Elevator 42 comprises a pair of endless roller chains 54, 56 carrying transverse scrapers each in the form of a cane pushing plate 58 which travel in a box-shaped housing defined by a floor 60, over which the cane pieces slide, and by elevator side walls 62, 64. Each plate 58 extends across substantially the full width and height of the housing.

As shown in FIG. 1, elevator 42 comprises a loading portion 66, an elevating portion 68 and an unloading portion 70 having angles of inclination with respect to the horizontal of 43°, 70° and 43° respectively. Chains 54 and 56 are guided and driven around these three runs by sprockets 72, 74, 76, 78 and guides 80, 82.

Cane retaining means in the form of a wire mesh belt 84 is provided immediately above plates 58 in elevating portion 68 of elevator 42 to resist rolling back of the cane pieces carried by the elevator. Belt 84 is trained around end rollers 86, 88 of which roller 88 is driven by a chain 90 through sprockets 92, 94. Sprocket 94 is mounted on a radius arm 96 which pivotally interconnects the axes of sprockets 92, 94.

Figure 2:
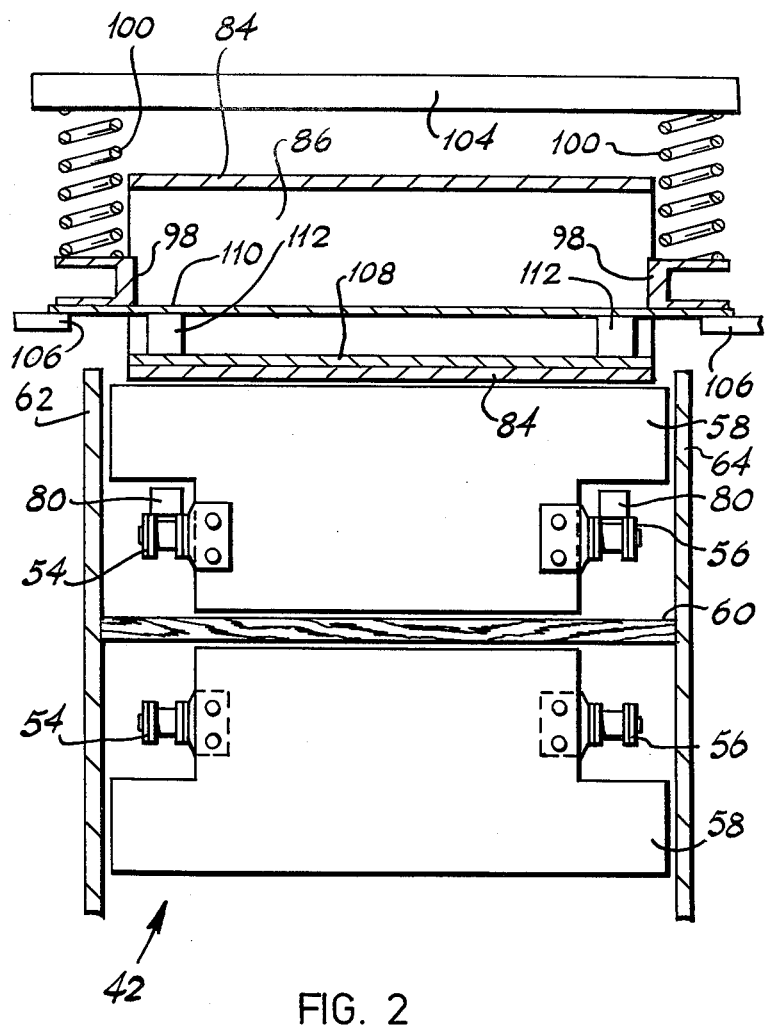
FIG. 2 shows a sectional view of the elevator taken on line 2—2 of FIG. 1.
Figure 3:
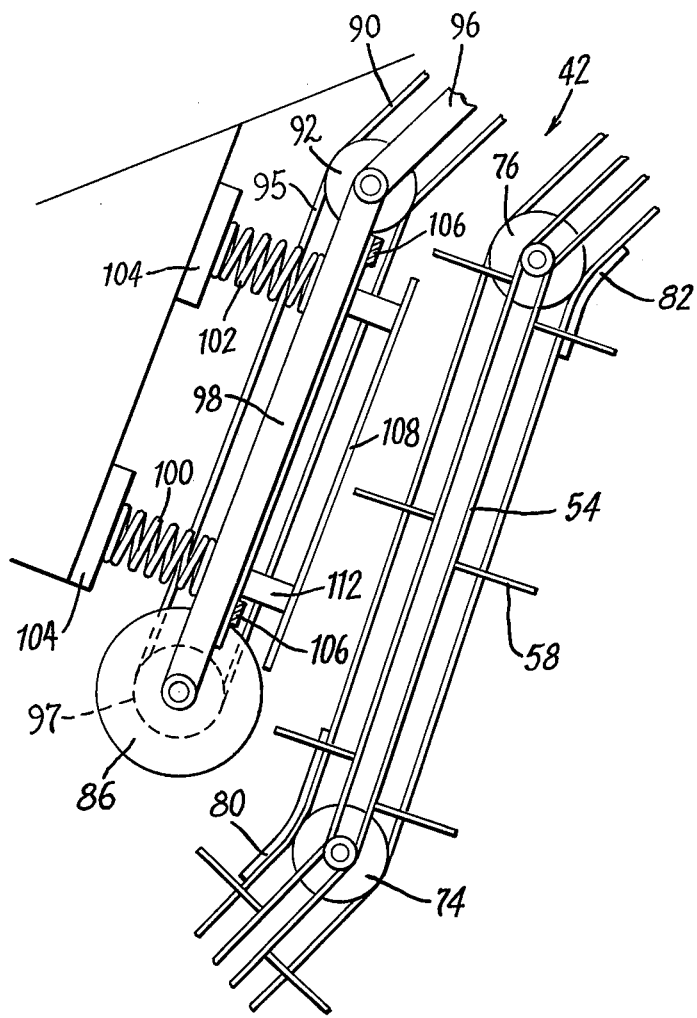
FIG. 3 shows an enlarged view of the elevator.

Rollers 86, 88 are mounted on a floating framework comprising side members 98 on which the rollers are journalled. Two pairs of coiled compression springs 100, 102 act between side members 98 and a fixed part 104 of the harvester's body and bias the side members against respective stops 106 also fixed to the harvester's body. The framework is thus capable of upward movement against the action of the springs from the position shown in FIG. 2.

A backing plate 108 is mounted above the lower run of belt 84 and extends across the full width thereof. The backing plate is mounted on side members 98 by means of a transverse structure 110 and supports 112 depending therefrom.

In use, standing cane passes between crop lifters 16 and is severed by base cutters 20. The severed cane sticks are fed by rollers 24 to 32 between chopper drums 36, 38. As shown in FIG. 1, cane pieces or billets emerging from the chopper drums fall onto the loading portion 66 of elevator 42 and are carried through elevating portion 68 to unloading portion 70. Trash removal apparatus 44 and 50 then effect cleaning of the billets before they are deposited in trailer 52.

As the cane billets pass up elevating portion 68 of elevator 42, wire mesh belt 84 ensures that there is no downward overflow of billets past the plates 58 despite the steep inclination of the said portion. The belt 84 moves at the same speed as the plates and defines, with floor 60 and side walls 62, 64, a tunnel through which the billets are moved.

When elevator 42 becomes overloaded, springs 100 permit upward movement of belt 84 to allow the glut of cane to pass but the belt nevertheless prevents any significant downward overflow of billets.

The principal advantage provided by the embodiment of the invention described above is that portion 68 of elevator 42 extends at an angle of inclination greater than 50°. This results in a reduction in the overall length of the harvester in consequence of which the harvester's stability and manoeuvrability are improved.

In the absence of cane retaining belt 84, elevator 42 would have to be mounted at an angle of inclination of less than 50° — as in the case of elevator 46 in FIG. 1 — in order to prevent the billets rolling back. The elevator would then occupy much more space in the longitudinal direction of the harvester than in the above embodiment.

Among modificiations which can be made to the above embodiment and which nevertheless embody the invention are:

1. use of angles of inclination of elevator 42 of up to 90° i.e. vertical;
2. use of an elevator 42 in which the unloading portion has the same inclination to the horizontal as the elevating portion;
3. use of a ceiling member in place of belt 84, the ceiling member not moving with the cane on elevator 42, but having a smooth lower surface for sliding engagement therewith. A rotatable roller which may or may not be driven is provided at the lower end of the ceiling member. This arrangement is similar to the embodiment described above with reference to the drawings, but with belt 84 removed, backing plate 108 and roller 86 constituting the ceiling member and the roller respectively.

It will of course be understood that it is the peculiar nature — as regards rolling characteriztics — of short lengths of sugar cane which has resulted in the details of the structure of the elevator 42 and cane retaining means 84 as described above. This structure is in no way relevant to the conveying of other crops having different transport characteristics — such as unthreshed grain crops — and no claim in that respect is made herein.

I claim:

1. A sugar cane harvester comprising cane base cutting means capable of severing cane sticks from their roots, cane dividing means capable of cutting each cane stick into two or more pieces, and an elevator capable of elevating the cane pieces, characterized in that at least part of the travel of the elevator extends upwards at an inclination of from 50 to 90 degrees with respect to the horizontal when the harvester is standing on horizontal ground, and that cane retaining means is provided, said cane retaining means including a cane retainer frame supported on the harvester adjacent to the elevator for elevating cane pieces, a ceiling member with a smooth lower surface mounted on the cane retainer frame above at least a portion of the upper run of the elevator and cooperating therewith to define an upwardly-extending tunnel through which cane is conveyed, and a rotatable feed roller mounted on the cane retainer frame adjacent to the lower end of the ceiling member for insuring that cane pieces carried by the elevator are fed under the ceiling member.

2. A sugar cane harvester according to claim 1 characterized in that the elevator comprises a drivable endless tension member and transverse cane pushing members attached thereto, each cane pushing member being of such dimensions as to extend from adjacent the cane-engaging surface of the elevator to adjacent the cane retaining means.

3. A sugar cane harvester according to claim 1 characterized in that the elevator comprises a loading portion at the lower end thereof, the loading portion leading to the said part which extends at an inclination of from 50° to 90°, the inclination of the loading portion with respect to the horizontal being less than that of the said other part.

4. A sugar cane harvester according to claim 3 characterized in that the said loading portion is positioned to receive cane pieces falling from the cane dividing means.

5. A sugar cane harvester according to claim 1 characterized by cane trash removal apparatus positioned to act upon the cane pieces discharged from the upper end of the elevator.

6. The sugar cane harvester of claim 1 including drive means for rotating the rotatable feed roller mounted on the cane retainer frame.

7. The sugar cane harvester of claim 1 including resilient means mounted on the harvester and in contact with the cane retainer frame to resist movement of cane retainer frame, the ceiling member and the rotatable feed roller mounted on the cane retainer frame, away from the elevator.

8. The sugar cane harvester of claim 6 including drive means for rotating the rotatable feed roller mounted on the cane retainer frame.

* * * * *